United States Patent [19]

Anderson

[11] 3,918,922

[45] Nov. 11, 1975

[54] METHOD FOR MAKING METAL-TO-CERAMIC SEALS

[76] Inventor: Norman C. Anderson, 1526 Beach Park Blvd., Foster City, San Mateo County, Calif. 94404

[22] Filed: Feb. 7, 1973

[21] Appl. No.: 330,376

Related U.S. Application Data

[62] Division of Ser. No. 148,891, June 1, 1971, Pat. No. 3,736,650.

[52] U.S. Cl. .............. 29/182.3; 29/473.1; 29/501; 29/502; 29/504; 75/.5; 106/1; 148/22; 200/42.22

[51] Int. Cl. ............................................ B22f 7/02

[58] Field of Search ........ 29/182.3, 473.1, 501, 502

[56] References Cited
UNITED STATES PATENTS

| 3,376,121 | 4/1968 | Lawrence | 29/473.1 |
|---|---|---|---|
| 3,386,159 | 6/1968 | Milch et al. | 29/502 |
| 3,386,160 | 6/1968 | Milch et al. | 29/502 |
| 3,479,170 | 11/1969 | Louden | 29/473.1 |
| 3,594,895 | 7/1971 | Hill | 29/473.1 |
| 3,636,297 | 1/1972 | Pakutka et al. | 29/502 |
| 3,736,650 | 6/1973 | Anderson | 29/473.1 |

*Primary Examiner*—Leland A. Sebastian
*Assistant Examiner*—B. Hunt

[57] ABSTRACT

An alkali metal corrosion resistant vacuum tight metal-to-ceramic seal is formed between a high alumina ceramic body and a refractory alkali metal resistant metal member, such as Cb-1Zr, by interposing a powdered brazing mixture comprising by weight a majority of elemental columbium powder and a second metal powder selected from the class consisting of iron and nickel, and firing the assembly in vacuum at a temperature between 1500°C and 1675°C to partially melt a portion of the powder to form a melted bonding phase component interstitially of the undissolved columbium particles for bonding the ceramic to the metal part.

18 Claims, No Drawings

METHOD FOR MAKING METAL-TO-CERAMIC SEALS

GOVERNMENT CONTRACT

The invention herein described was made under a contract with the U.S. Navy.

This is a division of application Ser. No. 148,891 filed June 1, 1971 now U.S. Pat. No. 3,736,650.

DESCRIPTION OF THE PRIOR ART

Heretofore, attempts have been made to make vacuum tight, high strength, brazed seals between a high alumina body and an alkali corrosion resistant metal member, as of Cb-1Zr. In this prior art, a high temperature brazing alloy, Cb-33Fe, foil was placed between the metal member and a bare or tungsten metalized ceramic member to be brazed. The assembly was heated in vacuum to a brazing temperature of approximately 1670°C for melting the brazing alloy and forming a brazed joint between the Cb-1Zr member and the high alumina body.

The resultant metal-to-ceramic joints were relatively weak, especially with bare ceramic, thereby making such metal-to-ceramic seals unsuited for high temperature high strength applications as required for use in thermionic energy converters and high power infrared radiaiton sources, such as pulsed cesium vapor arc lamps. The aforecited Cb-33Fe brazement alloy and seal configuration is disclosed in the final technical report on U.S. Navy contract NObs-90496, titled "Research and Development Program of Thermionic Conversion of Heat To Electricity," by General Electric Nuclear Thermionic Power Operation, Pleasanton, California, Volume 2, July, 1968.

SUMMARY OF THE PRESENT INVENTION

The principal object of the present invention is the provision of an improved method for making metal-to-ceramic seals.

In one feature of the present invention, the ceramic body is coated with a brazing mixture which includes a volatile vehicle in which is suspended a powdered mixture comprising by weight a majority of columbium powder and a second metal powder selected from a class consisting of iron and nickel. The coated ceramic body is fired in vacuum with an assembled metal member to a temperature sufficiently high to produce a partial melting of the powdered mixture such that upon cooling a solidified bonding phase component or matrix is formed interstitially of the undissolved columbium particles for bonding the columbium particles to the ceramic body, whereby a high strength bond between the columbium particles and the ceramic body is obtained.

In another feature of the present invention, the ceramic body is selected from the class consisting of alumina, pore free translucent alumina, and sapphire.

In another feature of the present invention, a metal part which is to be bonded to the ceramic is selected from the class consisting of tantalum, tantalum alloys, molybdenum, columbium, and columbium alloys.

Other features and advantages of the present invention will become apparent upon a perusal of the following specification.

DESCRIPTION OF THE PREFERRED EMBODIMENTS

A brazing mixture is prepared which comprises a powdered mixture of metal powders suspended in a volatile vehicle. The powdered mixture is formulated by combining appropriate amounts of −325 mesh elemental columbian powder and −325 mesh iron powder or −100 mesh nickel powder. The powders are combined with a majority of columbian powder by weight. More particularly, a preferred embodiment employs approximately 17 percent iron powder or in the case of nickel, approximately 15 percent by weight nickel powder.

The powders are mixed with a methyl methacrylate based lacquer, such as a lacquer having as a base a material available under the trademark Lucite, to give the desired consistency. The solid and liquid constituents of the brazing mixture are mixed by holding them in a rolling container, either with or without a grinding media, for several hours. This serves to intimately mix the metal powders and to promote their suspension in the liquid media.

The brazing mixture is applied to that region of a ceramic body to be sealed. Suitable ceramic bodies include high alumina ceramic, (where "high alumina" is defined to mean 85 percent or more of $Al_2O_3$), pore free translucent alumina, and sapphire. The brazing mixture may be applied by any suitable means, such as by needle painting, roller coating, brushing, dipping, or spraying. The coating is preferably applied to a thickness, as of 0.005 to 0.010 inch.

The coated ceramic bodies to be brazed are assembled with the metal member, to be joined to the ceramic, in a molybdenum or molybdenum-alumina brazing fixture and allowed to dry for several hours. Tungsten or molybdenum weights are used so that the seal area is under a minimum axial compressive load, as of 0.6 pounds per square inch.

As an alternative to applying the brazing mixture directly to the ceramic body, a first metalizing layer may be applied and sinter-fired onto the ceramic body and the brazing mixture subsequently applied to the metalized layer. Suitable metalizing metal layers include molybdenum and tungsten. Such underlaying metalized layers may be applied to the ceramic body as by evaporation in vacuum or by sputtering in a glow discharge at relatively low pressures, as of $10^{-3}$ torr. More commonly such layers can be applied in the form of metalizing paints and subsequently sinter-fired at high temperature to achieve a dense adherent coating.

The ceramic, metalized or bare, and metal assembly is fired in vacuum to a brazing temperature sufficiently high to produce only a partial melting of the powdered mixture, such that upon cooling a solidified bonding phase component or matrix is formed interstitially of the undissolved columbium particles for bonding the undissolved columbium to the ceramic body. The undissolved columbium particles form a ductile metal bridge between the ceramic body and the metal part. The lacquer vehicle volatilizes at low temperature and is pumped by the vacuum system. A suitable brazing temperature range is between 1500°C and 1675°C.

The resultant metal-to-ceramic seals are vacuum tight, have relatively strong tensile strength, as of 20,000 psi, and are corrosion resistant to alkali metal. The joints may be repetitively cycled to relatively high temperatures, as of 1,000°C or higher, in continuous exposure to alkali metal liquid or vapor.

Formation of the final brazement configuration from an initial Cb-17Fe mixture probably occurs as follows: During heatup, the first liquid appears at 1370°C corresponding to the CbFe$_2$-Fe (solid solution) eutectic. As temperature is increased to 1600°C, additional columbium dissolves in the melt until the melt composition corresponds to the Cb$_3$Fe$_2$-CbFe$_2$ eutectic point. A considerable amount of undissolved particulate columbium remains, and at this point, a kind of pseudoequilibrium is reached because further dissolution of columbium tends to freeze the melt phase.

Quantitative electron probe microanalysis of the particulate and continuous regions in Cb-17Fe brazements confirms the above description. Compositions of the respective regions were found to be Cb-8%Fe and Cb-34%Fe by weight. Evidently, the undissolved columbium particles are saturated with iron by solid state diffusion during the brazing process.

The Cb-17Fe brazement can be thought to consist of columbium-rich particles that form a bridge-like network between the Cb-1Zr and pore free translucent alumina (Lucalox) members, and a hard, continuous cementing or bodying phase that provides the essential bonding. The columbium rich particulate phase probably matches the Lucalox ceramic member quite well in thermal expansion behavior owing to the positive influence of the undissolved iron.

The cementing or bonding phase, actually a two phase Cb$_3$Fe$_2$-CbFe$_2$ eutectic micromixture, is expected to have a somewhat higher thermal expansion coefficient than the alumina body. Ordinarily, a mismatch of this sort, coupled with the high elastic moduli of the ceramic and cementing phase, would impart high shearing stress to the ceramicbrazement interface. The presence of the large volume fraction of columbium-rich particulate phase in the brasement conceivably mechanically constrains the cementing phase to follow an average thermal expansion (or contraction) path determined by the weighted contributions of the phases present (with the weightings being based primarily on respective volume fractions and elastic moduli). Thus, the average thermal expansion behavior of the brazement composite probably is not very much different from that of the Lucalox and, consequently, interfacial stresses are probably low.

In the case where nickel powder is mixed with columbium powder, a particularly suitable mixture is Cb-15Ni. When such mixtures are brazed at temperatures above 1500°C, bond strengths are obtained which are comparable to those obtained with the aforedescribed Cb-17Fe brazements. The resultant brazement is quite similar in structure to the Cb-Fe structure. More particularly, a particulate phase of undissolved columbium is obtained with a continuous or cementing phase of CbNi interstitially disposed of the undissolved columbium particles and forming a thin bonding layer between the particulate columbium and the underlaying ceramic body.

What is claimed is:

1. A brazing mixture comprising a volatile vehicle in which is suspended a powdered mixture comprising by weight a majority of columbium powder and a second metal powder selected from a class consisting of iron and nickel.

2. The brazing mixture of claim 1 wherein said columbium powder comprises elemental columbium particles of −325 mesh size.

3. The brazing mixture of claim 1 wherein said second metal powder comprises iron particles of −325 mesh size.

4. The brazing mixture of claim 1 wherein said second metal powder comprises nickel particles of −100 mesh size.

5. The brazing mixture of claim 1 wherein said second metal powder comprises substantially 17 percent iron powder by weight.

6. The brazing mixture of claim 1 wherein said second metal powder comprises substantially 15 percent nickel powder by weight.

7. The brazing mixture of claim 1 wherein said volatile vehicle comprises a methyl methacrylate based lacquer.

8. An article of manufacture comprising a metal member, a ceramic member, and a seal which bonds said metal member to said ceramic member, said seal comprising particles of columbium embedded in a matrix consisting essentially of columbium and a second metal, said second metal being selected from the group consisting of iron and nickel.

9. The article of claim 1 wherein said metal member essentially comprises a material selected from the group consisting of tantalum, tantalum alloys, molybdenum, columbium, and columbium alloys.

10. The article of claim 1 wherein said metal member is made of Cb-1Zr.

11. The article of claim 1 wherein said ceramic member essentially comprises a material selected from the group consisting of alumina, pore free translucent alumina, and sapphire.

12. The article of claim 1 wherein said second metal of said matrix comprises iron in the amount of approximately 17 percent by weight.

13. The article of claim 1 wherein said second metal of said matrix comprises nickel in the amount of approximately 15 percent by weight.

14. The article of claim 1 wherein said seal further comprises a metalizing layer in contact with said ceramic member, said metalizing layer essentially comprising a metal selected from the group consisting of molybdenum and tungsten.

15. A metal-to-ceramic seal comprising particles of columbium embedded in a matrix consisting essentially of columbium and a second metal, said second metal being selected from the group consisting of iron and nickel.

16. The seal of claim 8 wherein said second metal comprises iron in the amount of approximately 17 percent by weight.

17. The seal of claim 8 wherein said second metal comprises nickel in the amount of approximately 15 percent by weight.

18. The seal of claim 8 further comprising a layer of metal selected from the group consisting of molybdenum and tungsten.

* * * * *

UNITED STATES PATENT AND TRADEMARK OFFICE
CERTIFICATE OF CORRECTION

PATENT NO. : 3,918,922
DATED : November 11, 1975
INVENTOR(S) : Norman C. Anderson It is certified that error appears in the above-identified patent and that said Letters Patent are hereby corrected as shown below:

On the cover sheet, in the heading, change the title to read -- METAL-TO-CERAMIC SEALS --.

On the cover sheet, in the heading, insert -- [73] Assignee: Varian Associates, Palo Alto, California --.

Column 3, line 25, change "bodying" to -- bonding --.

Column 3, line 36, change "ceramicbrazement" to -- ceramic-brazement --.

Column 3, line 38, change "brasement" to -- brazement --.

Signed and Sealed this eleventh Day of May 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,918,922            Dated November 11, 1975

Inventor(s) Norman C. Anderson

It is certified that error appears in the above-identified patent and that said Letters Patent are hereby corrected as shown below:

Column 4, line 28, change "1" to -- 8 --.

Column 4, line 32, change "1" to -- 8 --.

Column 4, line 34, change "1" to -- 8 --.

Column 4, line 38, change "1" to -- 8 --.

Column 4, line 41, change "1" to -- 8 --.

Column 4, line 44, change "1" to -- 8 --.

Column 4, line 54, change "8" to -- 15 --.

Column 4, line 57, change "8" to -- 15 --.

Column 4, line 60, change "8" to -- 15 --.

Signed and Sealed this

Tenth Day of August 1976

[SEAL]

Attest:

RUTH C. MASON
Attesting Officer

C. MARSHALL DANN
Commissioner of Patents and Trademarks